(12) United States Patent
Lam et al.

(10) Patent No.: US 6,983,216 B2
(45) Date of Patent: Jan. 3, 2006

(54) TEST AUTOMATION METHOD AND TOOL WITH DYNAMIC ATTRIBUTES AND VALUE SETS INTEGRATION

(75) Inventors: Thanh V. Lam, Poughkeepsie, NY (US); Giampaolo Lauria, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/740,268

(22) Filed: Dec. 18, 2003

(65) Prior Publication Data

US 2005/0137819 A1 Jun. 23, 2005

(51) Int. Cl.
*G06F 19/00* (2006.01)
(52) U.S. Cl. ....................... 702/119; 702/108
(58) Field of Classification Search ............... 702/108, 702/117–123, 182, 183, 186, 189, FOR 134, 702/FOR 160; 709/223, 224; 714/40, 43; 717/124–131, 168
See application file for complete search history.

(56) References Cited

U.S. PATENT DOCUMENTS

| | | | | |
|---|---|---|---|---|
| 5,634,098 A | * | 5/1997 | Janniro et al. | 714/38 |
| 5,751,941 A | * | 5/1998 | Hinds et al. | 714/38 |
| 6,002,869 A | * | 12/1999 | Hinckley | 717/124 |
| 6,105,148 A | * | 8/2000 | Chung et al. | 714/16 |
| 6,182,245 B1 | * | 1/2001 | Akin et al. | 714/38 |
| 6,662,312 B1 | * | 12/2003 | Keller et al. | 714/38 |
| 6,687,834 B1 | * | 2/2004 | Morales et al. | 713/201 |

* cited by examiner

*Primary Examiner*—Michael Nghiem
*Assistant Examiner*—Douglas N. Washburn
(74) *Attorney, Agent, or Firm*—Lawrence D. Cutter; Daryl K. Neff (57) ABSTRACT

A test automation tool is provided which is operable to integrate a set of dynamic attributes and values into tests to be performed on a computing environment. The test automation tool includes a job submission engine (JSE) operable to receive input regarding first attributes unchanged from a first computing environment and second attributes representing change from the first computing environment. A job control file generator (JCFG) is provided in electronic communication with the job submission engine and is operable to automatically generate job control files (JCFs) for controlling testing of the computing environment according to attribute values including first attribute values and second attribute values. First attribute values are generated based on an automatic sampling of values of first attributes. The JSE is further operable to automatically submit the JCFs to the computing environment for execution and to automatically monitor execution according to the JCFs.

20 Claims, 3 Drawing Sheets

TEST AUTOMATION METHOD AND TOOL WITH DYNAMIC ATTRIBUTES AND VALUE SETS INTEGRATION

BACKGROUND OF THE INVENTION

This invention relates to an automated test tool for computer systems and in particular to a test automation tool having dynamic attributes for testing a computing environment.

An important aspect of design and fabrication of any technology is the testing of different features that make up that technology. Testing is not only used for quality control purposes, to ensure the reliability of existing technology, but is also a key requirement when introducing new features or when repackaging existing features in new and improved ways. This is particularly true in the computer industry as it relates to the testing of a computing environment having both hardware and software elements.

A foremost objective in providing testing tools and methodology, especially in the computer industry, is to provide thorough testing. Complex computing environments, which vary in numbers of and types of hardware and software, as well as operating systems and middleware, require many attributes to be tested to ensure system integrity. Systems have become so complex that it is frequently impossible to test all attributes of system organization and function. A challenge of present test methodologies is to be able to identify and test attributes of the system that are most likely to fail, and those that are most critical to its operation. Since system attributes can vary over a range of values, testing sufficient combinations of attributes having different values is difficult without some form of automation. However, test automation as provided by the prior art, has its own set of challenges.

A disadvantage of prior art test automation techniques is that they only test one sub-environment at a time, where attributes and their values are well defined and known. In complex computing environments where the environment includes many applications, configurations and sub-environments, test tools adaptable across the environment are not commonly available. Testing in one sub-environment or configuration alone is undesirable because it does not validate similar testing in other sub-environments or configurations.

In simple computing environments, testing is traditionally accomplished by entering the attributes and values as parameters manually, for example, on a command line for a particular test tool or script. With automation, programs can be designed to test a more inclusive set of values than those permitted by manual testing. The values to be tested in an automation scheme are normally kept in an input file. Automated test tools, therefore, have to be developed beforehand in order to make the input file available at time of test that has the test values to be used. This makes the changing of or incorporation of new attributes into the prior art automated test scenarios very difficult.

In addition, the necessity of choosing values beforehand leads to the problem of not knowing exactly what values need to be included for automated testing. Selecting particular attributes to be varied in different test scenarios for a complex computing environment could lead to an endless number of variations. The prior art automation schemes only cover limited predefined attributes and values, making it difficult to decide upon the right amount of attributes to be tested beforehand in order to ensure accurate test results.

There is a perennial need for automation tools that allow user input to customize a test scenario to particular feature of the system under test. This is because it could be impossible to account for all testing scenarios ahead of time. Often an unanticipated condition or unaccounted for need arises because of certain conditions only occurring during the test. For example, a particular test configuration may be only available in a certain time frame for testing purposes. However, in such instances, there may not be enough time and resources available to alter the test using the changed attributes, such that testing must proceed with pre-existing scenarios that do not adequately cover the computing environment.

Another problem with the existing prior art is that automated test tools are not designed to be flexible. Traditional automation tools only provide for a fixed set of input and output values. Changing a test scenario to expect different parameters, and checking for different results or errors, requires stopping tests at run-time. New input must be manually created before the test is restarted. These limitations hinder the purpose of the automation tool. Another problem relates to requirements that are hard-coded in scripts or in binary formats. In such cases, automated test tools that generate job conditions at run time do not allow the user to change pre-fixed attributes of control commands or to add or remove control commands unless they are defined in the scripts and program source files. This prevents last minute tests from being included, even when they are deemed essential.

Consequently, the designers of test tools for computing environments face many challenges today. Manual testing is tedious and impractical due to the number of test conditions that need to be varied. On the other hand, automation is inflexible under the prior art techniques and cannot be performed adequately across multiple configurations and sub-environments in a complex computing environment. Furthermore, significant time and resource constraints prevent testing of all attribute variations in such an environment. In addition, deciding what to test beforehand is often unfeasible and impractical under the current prior art techniques. Foregoing thorough testing, however, is also not a desirable option as it may lead to unwanted problems and increased risks to product performance. A new test automation tool and methodology is needed to address the above-mentioned concerns.

SUMMARY OF THE INVENTION

According to an aspect of the invention, a test automation tool is provided which is operable to integrate a set of dynamic attributes and values into tests to be performed on a computing environment. The test automation tool includes a job submission engine (JSE) operable to receive input regarding first attributes unchanged from a first computing environment and second attributes representing change from the first computing environment. A job control file generator (JCFG) is provided in electronic communication with the job submission engine and is operable to automatically generate job control files (JCFs) for controlling testing of the computing environment according to attribute values including first attribute values and second attribute values. First attribute values are generated based on an automatic sampling of values of first attributes. The JSE is further operable to automatically submit the JCFs to the computing environment for execution and to automatically monitor execution according to the JCFs.

The recitation herein of a list of desirable objects which are met by various embodiments of the present invention is not meant to imply or suggest that any or all of these objects are present as essential features, either individually or collectively, in the most general embodiment of the present invention or in any of its more specific embodiments.

DESCRIPTION OF THE DRAWINGS

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

DETAILED DESCRIPTION OF THE INVENTION

According to embodiments of the invention, a test automation tool and method is provided that can be applied flexibly to a broad range of test coverage needs. Such automation tool and method can be applied across computing environments, allowing testing of applications and configurations without regard to whether the computing environment is made up of only a single computer unit or a complex and varied set of networked nodes having a variety of operating systems and applications. In contrast to the test methods of the prior art scenarios, the embodiments of the invention are well adapted to testing of dynamically changing environments where nodes, configurations and applications are being constantly modified, added or removed.

A feature of the test automation tool provided herein is that the user is given the ability to define attributes and their values on which test scenarios will be based. Test needs change dramatically in terms of changes in attributes and their values when there is change in a system, or in more complex environments when moving from one system configuration to the next.

Figure 1:
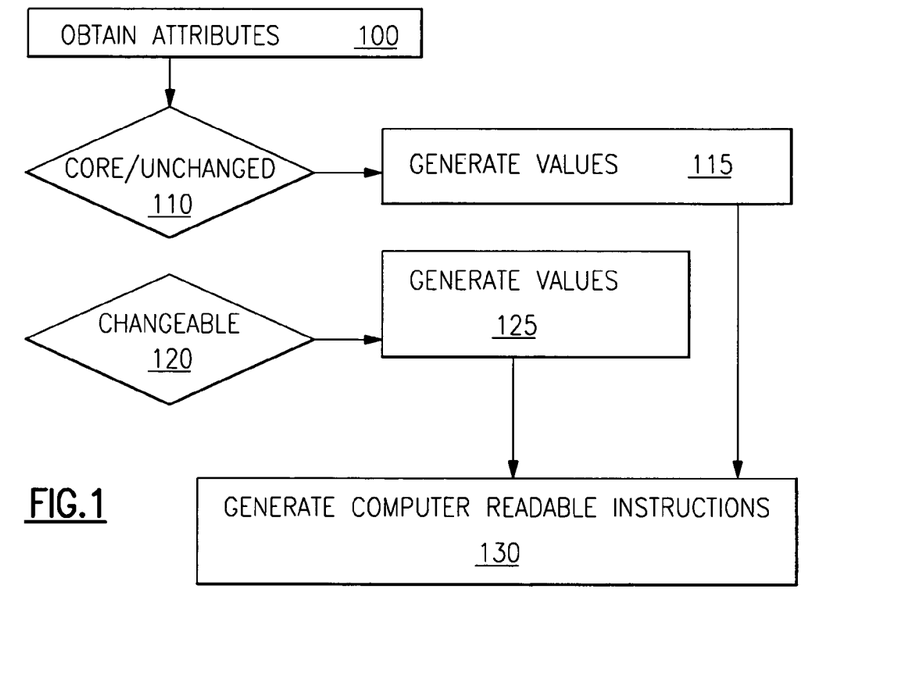
FIG. 1 illustrates process flow for a test automation method according to an embodiment of the invention.

In an embodiment of the invention, a method and a tool for generating dynamic attributes and value sets are provided, as depicted in FIG. 1. For ease of reference, aspects of an automation tool are hereinafter referenced as the dynamic attributes and values sets integrator or (DAVSI), with the understanding that the name DAVSI shall not be indicative of any restriction, implications or limitations imposed by the choice of words, as other names and variations may be selected, according to the embodiments of the present invention. As depicted In FIG. 1, testing attributes define the range of functions upon which one or more set of tests will be based and automated. For each selected attribute, as provided in FIG. 1, specific testing values are then generated for as shown at 115 and 125.

According to DAVSI, attributes for testing are classified in one of two categories as core attributes and changeable attributes, as shown at 100. In an embodiment, these attributes are identified and categorized based on job control commands, but users can also define these attributes separately. The core attributes, also called generic attributes, reflect those attributes that are considered to be common and non-changing in a majority and preferably all test cases that are to be generated. By contrast, the changeable attributes, also known as non-generic attributes, represent those attributes that are expected to vary. Changeable attributes further belong to one of two classes, namely dynamic attributes and special attributes. Dynamic attributes frequently change from one test to another for a variety of reasons, not all of them being predictable. Special attributes, also referred to at times as user specific attributes are specially defined attributes that may be test specific, such as those that may be specifically chosen by the user for a specific purpose for a particular test.

In every test scenario, certain attributes are necessary to test which the user may not care about or is not interested in testing particular values that attribute. In such cases, as shown at block 115, the built-in logic and rules of DAVSI automatically generate values for such attributes within ranges of values over which they vary. DAVSI further permits change at a later time, if the attributes and their values change. In a preferred embodiment, the DAVSI generated values of these attributes will be held as core attribute information, as it is unlikely that they need to be varied from one test to another.

The core versus changeable classification of attributes determines which attributes are tested more thoroughly. In a preferred embodiment, for example, testing of core attributes is conducted on a random basis as opposed to the changeable attributes that have to be tested one by one to ensure integrity of the computing environment.

Generally attributes and their associated values are determined and categorized based on a variety of factors and a combination of elements such as new design, timing of the test and even user input selection. In different embodiments of the present invention, a variety of ways are utilized to select attributes for test. In one embodiment, for example, users select the attributes themselves. In another embodiment, DAVSI selects attributes automatically by monitoring the workloads and resources of the computing environment. However, the sets of rules and logic that are built into DAVSI are designed in a way as to assist selection of test values in the most effective and creative ways. Based on the attribute categorization and values, DAVSI then generates computer readable instructions, as shown at 130, to provide automated testing in the computer environment. In a preferred embodiment this task is accomplished through the generation of one or more job control commands. New job control commands are generated dynamically for changing values so that new test scenarios are created to address unanticipated situations on an "on-the-fly" basis, allowing test runs to proceed without needing to stop to gather information for further testing.

Figure 2:
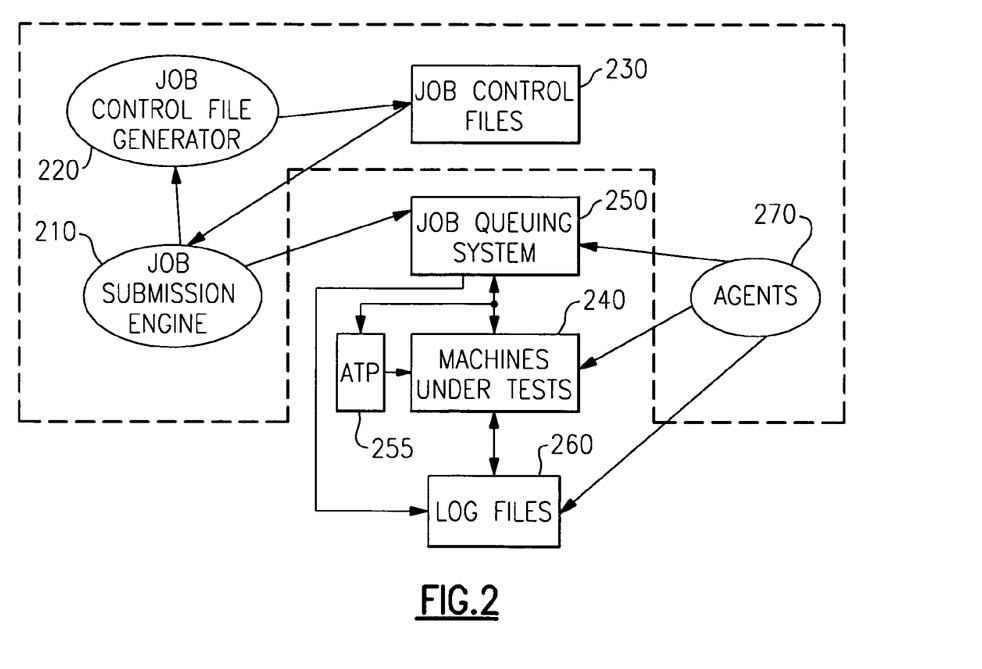
FIG. 2 is a block and schematic diagram illustrating components of a test automation tool according to an embodiment of the invention.

An overview illustrating the components of a test automation tool for providing DAVSI according to an embodiment of the invention is illustrated in FIG. 2. As shown therein, the test automation tool includes a job submission engine (JSE) 210, a job control file generator (220) for creating job control files (JCFs) 230, and one or more agents 270. The job submission engine (JSE) 210 is in charge of obtaining input from interfaces, such as user interfaces. These inputs are provided to the JCFG 220 which identifies and categorizes the attributes of the test and generates job control files based on the attributes for further testing. The job control files are then provided back to JSE for running the actual tests.

The job queuing system 250 is not a part of the test automation tool 200, but rather, forms a part of the system under test, whether such system contains a single node or a cluster of nodes. The job queuing system is typically implemented by software which runs above the operating system level. The function of the job queuing system is to assign jobs to a node or nodes of the computing environment under test 240, according to parameters of the job such as its priority, the number of nodes, etc., as submitted thereto by the JSE 210.

The job queuing system 250 schedules execution of jobs including those in which existing test programs are executed. To this end, an application test pool 255 is provided, which contains a body of applications adapted to exercise various features of the system under test 240. Such applications can be pre-installed on the nodes, or otherwise brought onto the system under test as needed for execution of a particular job.

Results of job execution are stored to a log file 260. The log file 260 holds the necessary information rather than all common job control commands, with the added benefit of reducing its size dramatically. The information stored in the log file is also necessary for tracing back the value set for each attribute in each test case. This simplifies the debugging and problem isolating process.

In addition to the above-described elements, the agents 270 are provided for the purpose of analyzing job completion and/or error analysis. The purpose and operation of agents 270 will be described more fully below.

An example of such agent is a job results analysis (JRA) agent, as shown at 273. JRA and a list of other availably used agents can be used to create specific test automation instructions and programs. For example, it maybe essential that any test automation tool have an error analysis agent as well. This is so that errors when happen with the automation method and tool itself can be monitored and the capability of tracing back jobs or application features can also be placed under control. To accomplish this task specific agents are used to analyzing certain aspects of the job results that have led to creation of errors or error like conditions. For example, all abnormal conditions may be registered as error while conditions arising out of job cancellations or intentional putting of jobs on hold, are not really error conditions and shall not be treated as such. In such an instance the analysis task is broken up into smaller agents to prevent all of the analysis into one big program or process. Usually users would monitor test results, but agents can be provided in similar ways to automate, or even semi-automate such tasks when desired.

The test automation tool makes use of an application test pool (ATP) as shown at 255. This includes the actual applications or test programs for which JCFG 220 generates the job control file. For automating purposes, the applications are categorized into different groups. As mentioned earlier, some of the job command file attributes have different values for different groups of applications. In this way, the test automation tool accommodates jobs having special requirements so that different types of jobs can be incorporated into testing. The same ATP can be used in this way even in different configurations or releases. It is also easier to incorporate newly added features in such case.

Figure 3:
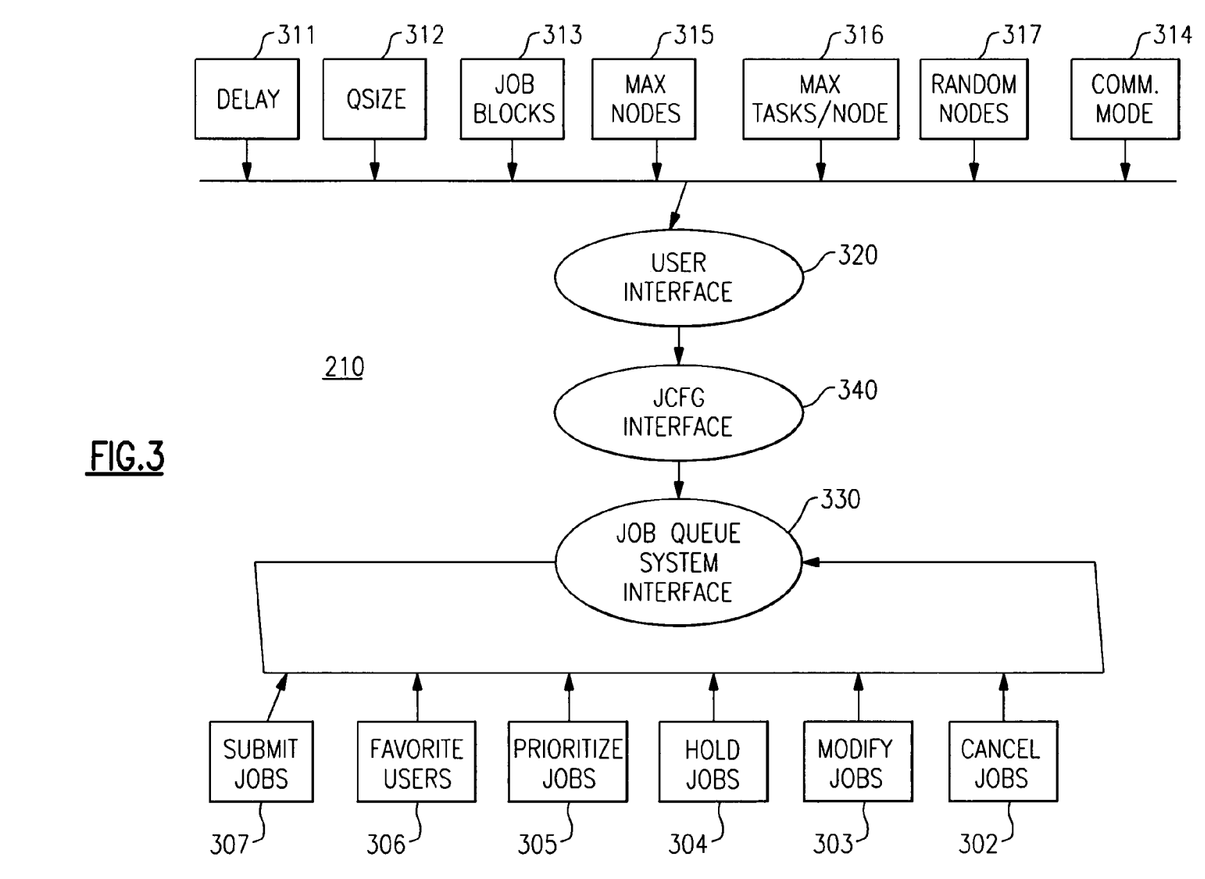
FIG. 3 is a diagram illustrating a job submission engine according to an embodiment of the invention.

Now that the components of the test automation tool have been introduced, the structure and operation of each component is now described. The JSE 210 is the focal point for job integration of the test automation tool. As shown in FIG. 3, in an embodiment JSE 210 includes several components, namely an interface 340 to the job control file generator, a user interface 320, and a job queuing system interface 330 which manages the submission of and running of test loops.

The interfaces 320 and 340 are provided to allow the selection of attributes, or input, either by communicating directly with the user or automatically by reference to pre-existing files, as will be described below. When input is not user selected, it is provided automatically by the test automation tool, such as by analyzing the computing environment and the level of testing to be performed as to particular attributes of the computing environment. Such analysis examines attributes that appear to affect testing of the environment in one way or another. Some of these attributes are illustratively depicted and represented in FIG. 3. Frequency of job submission as a function of time (creating delays between running loops), shown at 311; job population as relating to job queues, shown at 312; error injection criteria, shown at 313, including also other indirectly related eventualities such as number of jobs cancelled, as shown at 302, number of jobs that are put on hold, as shown at 304, are all examples of such attributes. Input can also be based on additional job activities such as favoring jobs and changing job priority, as shown at 306 and 305, respectively, these being among those which can be provided by the user, for example. The maximum number of resources, shown at 315, such as machines available for a particular test run and maximum job tasks running for each machine or resource, shown at 316, and randomization of number of nodes and tasks per nodes, shown at 317, are also available as input especially when multiple nodes are used. It should be noted that the list provided by FIG. 3 only serves an illustrative purpose and other input items may be added or removed from it. No matter how selected, the input provides the basis for attribute selection used in testing. From the attributes, values are generated and passed as parameters to help create testing scenarios that become the basis of JSE's running loops.

Depending on the number of jobs under test, a running loop may be simple and short or complex and long. Each of the parameters passed are ultimately used in creation of testing scenarios by the automated built-in factors of DAVSI for continuous testing. For example, input 311 relating to frequency of job submission is used to cause a delay time in between loops to control the pace of the test. However, since delay-free loop testing may create stress, input that adjusts the delay time can help set the pace of testing, and test for different levels of stress on the environment.

Similarly, input relating to job population values 312 can be used to generate tests that check degradation in the environment by adjusting the workload level. A sustained workload level throughout a test run can help detect signs of degradation on system performance at anytime during the test.

Input is also provided for establishing error injection criteria. Error injection is useful for creating abnormal conditions, as well as for recreating abnormal conditions that occur in other contexts. The manner that the computing environment or any component of it handles such abnormal conditions and the response or the computing environment in initiating recovery actions can be tested using error injection. Error injection can be used to mimic real-life problems and situations. Alternatively, some such scenarios do not rise to the level of a problem. For example, canceling jobs (302) and putting jobs on hold (304) may alter certain situations in the environment. Testing for such scenarios may help to identify defects sooner.

Additional job activities such as favoring certain jobs (306), and changing the priority of jobs (305) provide conditions that test effects of adding new features and/or workload to the computing environment. New features can usually be added to the workload as combinations of multiple purpose integrated testing. The effects are multiplied because these commands are queued up for the daemons to execute in the background while running applications in the computing environment. Normally, such tests have the effect of paralleling stresses at the same time on the daemons.

Input can also provide a test run that examines the number of available test nodes. A scenario testing the maximum number of nodes represented in a computing environment can result from the input as depicted by 315. There are instances in real life where the number of nodes available for job processing are fixed. However, in dynamic environments, nodes are added and dropped from the environment. In testing environments, the number of available test machines or nodes on which the test can be performed is as stable as the node itself. Therefore, due to the nature of most parallel applications, it is important to know in advance the number of available test machines or nodes in order to set up the test run that can replicate maximum stress. Changing the number of nodes used by a parallel job can change the number of jobs running simultaneously in the environment.

The maximum number of job tasks per node, as shown at 316, can also be varied according to input provided thereto. The maximum job tasks per node tends to stress the limits of available resources of the computing environment. These resources can include almost any computing component such as adapters, number of channels supported or even the number of windowed applications. These limits can vary significantly for different releases of different applications. Therefore, it is important to provide such input in order to test the limits of the computing environment when running in an environment that supports many nodes and configurations.

Input for randomizing the number of nodes 317 and number of tasks running on each node is another example. Here, in an embodiment, an experienced user is allowed to provide detailed input to select particular nodes in a quasi-random manner for testing based on the user's intuitive experience. Alternatively, the user may simply indicate a range of nodes or tasks per node to be particularly tested through random selection of particular values by the test automation tool.

While the JSE 210 collects input through interfaces and submits jobs for testing to a job queuing system of the computing environment, and monitors execution of the jobs, a set of job control files for submitting test jobs to be run on the computing environment are generated by the job control file generator (JCFG) 220.

Figure 4:
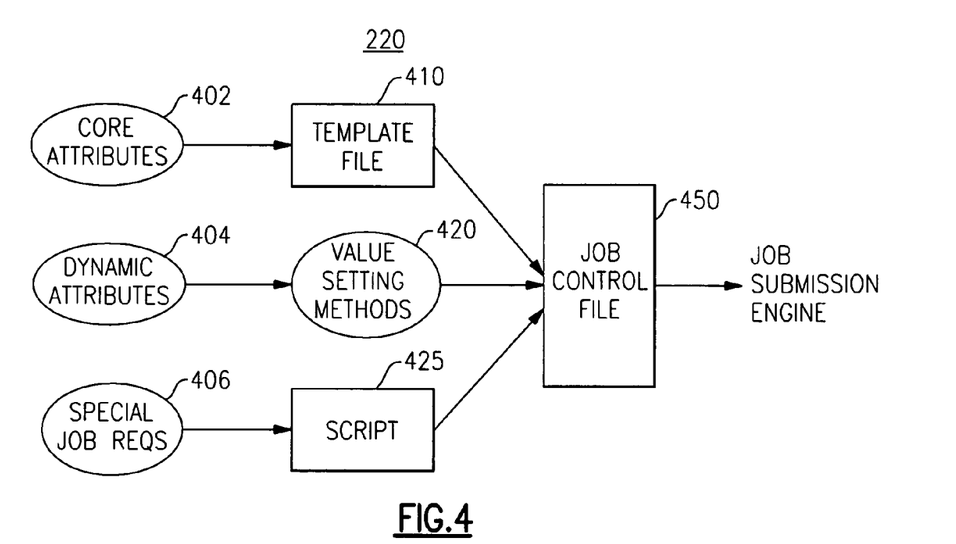
FIG. 4 is a flow diagram illustrating operation of a job control file generator according to an embodiment of the invention.

FIG. 4 is a flow diagram illustrating the functionality of JCFG 220. JCFG 220 is the responsible component for categorizing of to be tested attributes after they are provided through the input from JSE 210 that ultimately lead to generation of job control files that provide the test runs.

In an embodiment of the present invention, specific "keywords" are used to identifying attributes and distinguish them as part of the different categories discussed earlier. For example, keywords can be used to search for all functionality and therefore associated parameters and differentiate those that require careful testing from others. In this way, environments that are unknown to the user can be automatically searched to determine the attributes thereof and provide for their testing, according to the keywords. This approach ensures that a user or even an automation program has not inadvertently missed a feature that should be tested.

This concept is depicted in detail in FIG. 4. The generation of control files commences by categorization of JSE provided input in form of attributes. FIG. 4 provides for the organization of these attributes. As explored earlier, these attributes are deemed to be generic or core attributes 402 or dynamic attributes 404 or those relating to special job requirements 406. JCFG 220 does not treat these attributes equally but handles according to that required to be accomplished and the special job requirements which may be provided by the user. The JCFG generates JCFs by setting values of the attributes for testing as constrained by the time and resources allotted for testing. While core attributes are always required to be tested somewhat to ensure to assure continued performance, changeable attributes capable of causing new and changed conditions of the computing environment require more thorough testing.

To locate core attributes correctly and categorize them as such, in a preferred embodiment, the concept of keyword use is extended to core attributes. In this case, the core attributes are keywords provided in a template file, shown at 410. Each keyword is assigned a value, and JCFG reads the template file in creating job control files (JCFs), as shown at 450. The job control file 450 can be changed as often as necessary in a dynamic environment such that there is a newly generated file every time a configuration is changed; or it can be created once and forgotten about depending on the level of testing required for these values. The JCFG 220 does not need to read the values to be tested from the template file. As described below, the user can specify the ranges of values for certain attributes over a user interface. Then, the JCFG 220 generates a random value for each of those attributes. Although random, the value is within the range of values that the user specifies.

Changeable, i.e. non-generic attributes are also identified and categorized as such by JCFG 220. Such attributes, as discussed above, include dynamic attributes 404 and special job requirements 406 for execution. In an embodiment, a plurality of value setting methods 420 are provided and available for generating the values for creating JCFs for testing according to these attributes. These examples will be discussed in conjunction with illustrative depictions of FIG. 5.

Such value setting methods include generating JCFs that exercise all values of an attribute over a range of values of that attribute. As shown at 610 in FIG. 5, an attribute varies over a range of values. For example, if the attribute is the number of nodes in a cluster of nodes of the computing environment, and that number has changed from a prior configuration of 100 nodes to 110 nodes, the value setting method generates a series of JCFs to be performed in test iterations, each JCF testing according to a different number of nodes between 101 nodes and 110 nodes.

In an alternative embodiment, when the number of values of the attribute are smaller than the number of test iterations to be performed, some of the values are such that they will be exercised more often than other values during normal operation of the computing environment. In such case, the JCFG generates JCFs in which the number of times values are tested for that attribute are provided by a distribution of values 620 FIG. 5) according to a weighting or percentage that the value occurs or is expected to occur in normal operation.

Figure 5:
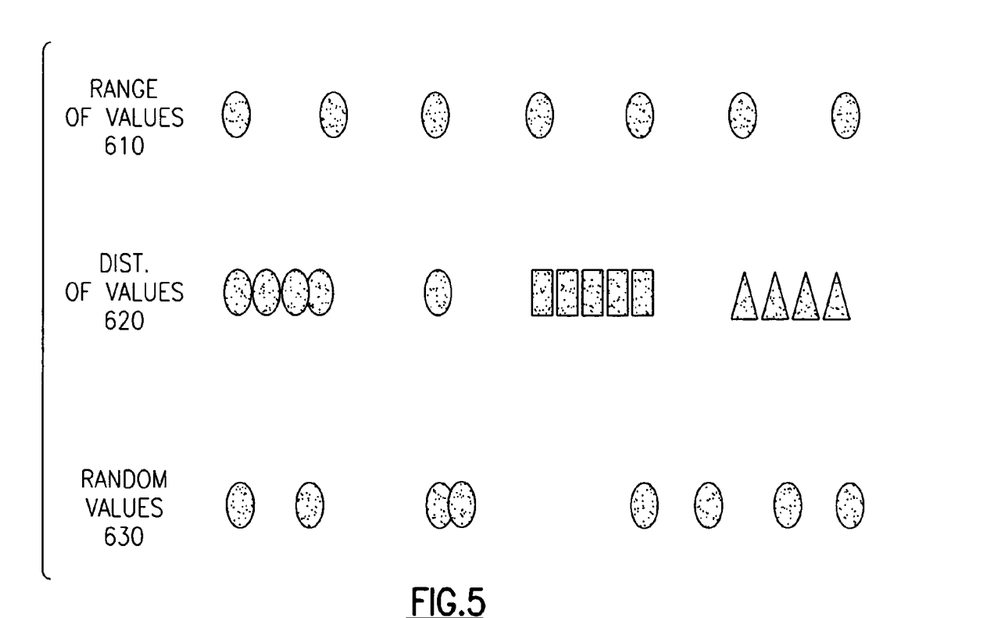
FIG. 5 illustrates value-setting methods according to embodiments of the invention.

In still another embodiment, when a value is to be randomly generated by the JCFG, an interface to the JCFG is provided for the user to specify the probability that a particular value or a value within a particular range of values will generated for a particular attribute. For example, when the attribute is "memory", it can take one of two values: "shared" and "non-shared". In such example, the user can specify a probability that a value of "shared" will be generated for about 90% of test cases, and a probability that a value of "non-shared" will be generated for about the other 10% of test cases.

According to yet another embodiment, the values of each attribute are selected randomly within the range of permitted values for the attribute, as shown at 630 in FIG. 5. In the two previous examples of value setting methods, predictable variation of attribute values were considered. In this example, values are selected randomly, in a way that, hopefully, matches unpredictable patterns in which some attributes vary. In such case, values are selected based upon the output of a random number generator, for example. This method is applied particularly to situations in which there are too many values for an attribute to provide 100% test coverage, i.e. there are too many values to be able to test according to every value of that attribute.

Value setting methods other than those specifically described herein can be used in addition to or in conjunction with the ones discussed in relation to FIG. 5. In a preferred embodiment of the present invention, once the test automation tool determines that a certain attribute should be categorized as dynamic, that categorization overrides other determinations for that attribute as may be provided elsewhere, such as in a template file having core attribute values.

Besides dynamic attributes, as discussed above, another type of changeable attributes are user-specified attributes including those referred to herein as special attributes or special job requirements. Determination of the values for testing according to user-specified attributes can be made with input from a user in relation to goals for testing to be performed in general, or alternatively, regarding testing to be performed for a specific run. In an embodiment, the user-specified attributes are stored in user input files that are referred to by the JCFG when creating JCFs for testing in accordance therewith.

With reference to FIG. 4, the manner of handling user-specified attributes is as follows. As shown at 425, the JCFG 220 reads the input file containing these attributes as a form of script. The job control file is then created as shown at 450 based on the script, although the script may include materials that fall outside of the job control file. Some examples reflecting the usages for such scripts are generating or copying input files; cleaning up of the temporary files for a particular job, especially between job runs; and passing data back to the JCFG. The latter operation, for example, may involve specifying the number of nodes that a particular JCF requires for performance and particular requirements for event processing.

In concluding a discussion about identification and selection of attributes and generation of the appropriate control files by JCFG 220, a special mention should be made to some tests that may not fall under ordinary attribute categorizations as discussed earlier. The generation of test for these special and selection of appropriate attributes may be done in a manner that is more of an exception to the routines described above. One such case is that of regression testing. The attributes in a regression test, for example, are handled in a similar manner to core attributes in that they are placed in a template file. Regression test attributes may contain non-generic attributes. Nonetheless, because of the nature of the regression test, all such values should be treated essentially as core attributes. This is because regression test attributes are not to be the focus of rigorous testing due to time and resource constraints, even though they nevertheless must be included in all test runs. Regression testing has to be performed on all test runs because the introduction of some new features or function may affect existing ones. It is possible that pre-existing features and functions of the computing environment will not work properly with the added features. In a preferred embodiment, a core list of attributes is kept in a file at all times specifically for regression test purposes.

By contrast, a focus test scenario usually involves the testing of new features that need to be thoroughly tested for completeness, at least for the first time. Therefore, in a focus test, unlike regression testing, because the concentration is on new and required attributes, all attributes are treated as non-generic, including the ones that under normal circumstances might have been identified as core. It can even be that after the first test run is provided, the focus test values, after such implementation need to be further tuned for testing purposes. The methods provided for setting values for testing according to embodiments of the invention, especially as described above relative to FIG. 4, provide the desired flexibility for performing testing according to the goals of such focus testing.

During testing of the system, it is likely that run-time problems will occur such as the failure of jobs to complete execution or their outright cancellation. Further, errors may occur during run-time which do not cause the job to fail or be cancelled, but nevertheless must be analyzed to determine the underlying problem. Conventionally, human operators perform the isolation of and causes of run-time failures and errors. This is done by the operator poring over reams of output logs in a very tedious and time-consuming process which requires high analytical and debugging skills, as well as a thorough understanding of the applications, and characteristics of the particular system and its performance.

In an embodiment of the invention, agents are provided which avoid the human operator from having to do most of the legwork in identifying errors and job failures, and much of the work to analyze run-time problems such as cancellation of jobs and/or analysis of errors. In a particular embodiment, the test automation tool also includes one or more agents 270 for the purpose of analyzing results of run-time problems such as cancellation of jobs and/or analysis of errors. For example, a job cancellation agent determines why a particular job fails to execute at run-time, and is cancelled instead. The job cancellation agent is used to research job logs and identify jobs that were cancelled. The agent saves a list of job identifiers, which specify a list of cancelled jobs.

An error analysis agent is desirably provided as a semi-automated agent that determines the types of errors and traces them back to the failing jobs. The error analysis agent identifies failed jobs by reviewing the list of job identifiers. An alert is then issued upon occurrence of an error. The agent or a human operator can then exclude jobs that were cancelled on purpose, in order to isolate true job failures when they occur. Alternatively, the error analysis agent scans log files 260 to determine the presence of errors. When it appears that an error has occurred, the error analysis agent runs through one or more troubleshooting algorithms in which various conditions in the system leading up to the error are checked against a set of predetermined comparison conditions. In such manner, troubleshooting is conducted by the agent to determine the presence of and type of error that has occurred, as depends upon the series of comparisons between system conditions and the comparison conditions.

As described herein, ease of test automation and flexibility of testing are provided by embodiments of the invention, while preserving thorough testing within the time and resource constraints allotted thereto. Embodiments of the invention are useful in a variety of computing environments, from the simple to the complex. Not only are the test automation tools described herein adapted for use in many different computing environments, but human operator needs not have full in-depth knowledge of the computing environment under test, either before or during the test cycle. The particular ability of the test automation system to analyze and categorize system attributes based on keywords or methodology is important in this respect. A test designer or test operator assigned to test a system belonging to a specific customer might only be provided selective information about the customer's system environment, other information being kept confidential.

In prior art test systems, less than full knowledge of the system under test would lead to generation of test scenarios that were inadequate to test all necessary functions of the system. Test tools were designed beforehand and could not be changed if a new setup was encountered. Running jobs had to be stopped to make changes to the setup, as well as to accommodate the automation tool. Alteration of the setup and disturbance to running jobs in customer settings were undesirable to customers. The automated categorization of attributes according to embodiments of the invention allow customer applications to be integrated into a pool of applications used for testing without requiring particular knowledge of the environment, or needing to change the setup or disturb jobs which are running.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

What is claimed is:

1. A test automation tool operable to generate and submit a plurality of job control files for verifying operability of a computing environment changed in relation to a first computing environment, comprising:
    a job submission engine (JSE) operable to receive input regarding first attributes of said changed computing environment which have not changed from the first computing environment and second attributes of said changed computing environment which represent change from the first computing environment;
    a job control file generator (JCFG) in electronic communication with said JSE, said JCFG being operable to automatically generate job control files (JCFs) for testing of the changed computing environment under a plurality of different test conditions, the plurality of different test conditions being defined by values of said second attributes and sampled values of said first attributes, said JCFG being operable to automatically sample a set of all possible values of said first attributes to obtain said sampled values, said sampled values including substantially fewer values than said set of all possible values,
    wherein said JSE is further operable to automatically submit said JCFs to be executed by the changed computing environment and to automatically monitor execution of said JCFs by the changed computing environment.

2. A test automation tool as claimed in claim 1 wherein said JCFG is operable to obtain said sampled values by random sampling.

3. A test automation tool as claimed in claim 2 wherein said JCFG is operable to obtain said sampled values based upon a user-specified probability that a value should fall within a particular range of values.

4. A test automation tool as claimed in claim 2 wherein said JCFG is operable to obtain said sampled based upon a user-specified probability that a particular value should occur.

5. A test automation tool as claimed in claim 1 wherein said JSE further comprises a user interface, wherein said JSE is operable to receive the input regarding at least some of said second attributes through said user interface.

6. A test automation tool as claimed in claim 5 wherein said JCFG is operable to generate said JCFs based on values of said second attributes provided through said user interface.

7. A test automation tool as claimed in claim 1 further comprising one or more agents operable to automatically analyze results of performing tests of said computing environment according to said JCFs.

8. The test automation tool of claim 6 wherein said JCFG is operable to generate said JCFs including parameters for controlling submission of said JCFs through a job queuing system of the computing environment.

9. The test automation tool according to claim 8 wherein said JCFG is operable to generate said JCFs by reference to a template file storing values of generic attributes obtained from input received by said JSE by employing one or more value-setting methods.

10. The test automation tool according to claim 9 wherein said JCFG is operable to generate said JCFs by reference to a script file storing special job request attributes.

11. The test automation tool according to claim 10 wherein said JCFs include one or more job control commands.

12. The test automation tool according to claim 1 further comprising an agent operable to review results of performance of said JCFs.

13. The test automation tool according to claim 10 wherein said agent includes a plurality of special task agents.

14. The test automation tool of claim 13 wherein said special task agents include a job results analysis agent and an error analysis agent.

15. The test automation tool of claim 14 wherein said error analysis agent includes a sub-task agent operable to analyze job cancellations and another sub-task agent operable to analyze on-hold jobs.

16. A method of generating computer readable instructions for verifying operability of a computing environment changed in relation to a first computing environment, comprising:
    obtaining attributes of the changed computing environment, said attributes including first attributes of said changed computing environment which have not changed from the first computing environment, and second attributes which represent change from the first computing environment;
    automatically sampling a set of all possible values of said first attributes to obtain sampled values of said first attributes, said sampled values including substantially fewer values than said set of all possible values; and
    generating values of said second attributes; and
    automatically generating computer readable instructions for performing testing of the changed computing environment under a plurality of different test conditions, the plurality of different test conditions being defined by said generated values of said second attributes and said sampled values of said first attributes.

17. The method of claim 16 wherein said step of automatic sampling includes random sampling.

18. The method of claim 16, wherein said values of said second attributes include a dynamic set of values changeable from test run to test run.

19. The method of claim 18, wherein said second attributes further include a user-provided special requirement attribute.

20. A machine readable medium having a set of instructions recorded thereon for performing a method of generating computer readable instructions for testing a computing environment changed in relation to a first computing environment, said method comprising:

obtaining attributes of the changed computing environment, said attributes including first attributes of said changed computing environment which have not changed from the first computing environment, and second attributes which represent change from the first computing environment;

automatically sampling a set of all possible values of said first attributes to obtain sampled values of said first attributes, said sampled values including substantially fewer values than said set of all possible values; and generating values of said second attributes; and automatically generating computer readable instructions for performing testing of the changed computing environment under a plurality of different test conditions, the plurality of different test conditions being defined by said generated values of said second attributes and said sampled values of said first attributes.

* * * * *